US009705336B2

(12) United States Patent
Feng et al.

(10) Patent No.: US 9,705,336 B2
(45) Date of Patent: Jul. 11, 2017

(54) METHOD AND APPARATUS FOR SECURITY CONSTRAINED ECONOMIC DISPATCH IN HYBRID POWER SYSTEMS

(71) Applicant: ABB Technology AG, Zurich (CH)

(72) Inventors: Xiaoming Feng, Cary, NC (US); Will Briggs, Sugar Land, TX (US); Mani Subramanian, Sugar Lane, TX (US); Ernst Scholtz, Houston, TX (US)

(73) Assignee: ABB Research Ltd., Zurich (CH)

( * ) Notice: Subject to any disclaimer, the term of this patent is extended or adjusted under 35 U.S.C. 154(b) by 714 days.

(21) Appl. No.: 14/080,523

(22) Filed: Nov. 14, 2013

(65) Prior Publication Data

US 2015/0134132 A1 May 14, 2015

(51) Int. Cl.
G06Q 50/06 (2012.01)
H02J 4/00 (2006.01)
G06Q 10/06 (2012.01)
H02J 3/00 (2006.01)

(52) U.S. Cl.
CPC .............. *H02J 4/00* (2013.01); *G06Q 10/063* (2013.01); *G06Q 50/06* (2013.01); *H02J 2003/007* (2013.01)

(58) Field of Classification Search
CPC .................................................. G06Q 10/063
USPC ................................ 700/286, 293; 703/3, 18
See application file for complete search history.

(56) References Cited

U.S. PATENT DOCUMENTS

2004/0181460 A1 9/2004 Bjelogrlic et al.
2010/0332373 A1 12/2010 Crabtree et al.

FOREIGN PATENT DOCUMENTS

EP 1265333 A1 12/2002
WO 2007113142 A2 10/2007

OTHER PUBLICATIONS

Stott et al., "Review of Linear Programming Applied to Power System Rescheduling" IEEE Conference Proceedings Power Industry Computer Applications Conference, 1979. PICA-79 pp. 142-154.*

(Continued)

*Primary Examiner* — Mohammad Ali
*Assistant Examiner* — Emilio J Saavedra
(74) *Attorney, Agent, or Firm* — Taft Stettinius & Hollister LLP

(57) ABSTRACT

The teachings herein disclose an advantageous method and apparatus for performing Security Constrained Economic Dispatch (SCED) for a hybrid power system that includes one or more AC grids interconnected with one or more multi-terminal High Voltage DC (HVDC) grids. The teachings include optimizing a non-linear objective function, subject to a set of constraints that include AC and DC grid constraints, for determining the SCED solution using successive linear approximation. The linear programming model used in the linear approximations is advantageously augmented with a DC grid portion in a manner that accounts for the effects of the DC grid on the AC grid, but which does not require exposing proprietary DC grid modeling details, and which conforms the resultant SCED solution to all applicable AC and DC grid constraints, including AC grid line flow constraints, AC grid power balance constraints, DC grid line flow constraints, and DC grid power balance constraints.

14 Claims, 7 Drawing Sheets

(56) References Cited

OTHER PUBLICATIONS

Beerten et al., "Generalized Steady-State VSC MTDC Model for Sequential AC/DC Power Flow Algorithms" IEEE Transactions on Power Systems (vol. 27, Issue: 2), Jan. 8 2012 pp. 821-829.*

Beerten "MATACDC 1.0 User's Manual" University of Leuven Jul. 4, 2012, 36 Pgs.*

Egea-Alvarez et al., "Primary and Secondary Power Control of Multiterminal HVDC Grids" 10th IET International Conference on AC and DC Power Transmission (ACDC 2012) Dec. 4-5, 2012, pp. 1-6.*

Lotfjou et al., "Hourly Scheduling of DC Transmission Lines in SCUC With Voltage Source Converters" IEEE Transactions on Power Delivery, vol. 26, No. 2, Apr. 2011, pp. 650-660.*

Jabr, Rabih A. et al., "A Homogeneous Linear Programming Algorithm for the Security Constrained Economic Dispatch Problem", IEEE Transactions on Power Systems, vol. 15, No. 3, Aug. 2000, pp. 930-936.

Stott, B. et al., "Linear Programming for Power-System Network Security Applications", IEEE Transactions on Power Apparatus and Systems, vol. PAS-98, No. 3, May/Jun. 1979, pp. 837-848.

Zhu, Jizhong, "Security-Constrained Economic Dispatch", Optimization of Power System Operation, Chapter 5, Dec. 31, 2009, pp. 141-210.

Ambriz-Pérez, H. et al., "High Voltage Direct Current Modelling in Optimal Power Flows." Elsevier; InternationalJournal of Electrical Power & Energy Systems. Mar. 2008. pp. 157-168. vol. 3, Issue 3.

Angeles-Carnacho, C. et al., "Inclusion of a High Voltage DC-Voltage Source Converter Model in a Newton-Raphson Power Flow Algorithm," Generation, Transmission and Distribution, IEE Proceedings. Jan. 30, 2004. pp. 691-696. vol. 150, Issue 6.

Asplund, G. "Application of HVDC Light to Power System Enhancement," Power Engineering Society Winter Meeting, 2000. IEEE. Jan. 23-27, 2000. pp. 2498-2503. vol. 4.

De Martinis, U. et al., "Optimal Load Flow for Electrical Power Systems with Multiterminal HVDC Links," Generation, Transmission and Distribution, IEE Proceedings C. Aug. 6, 2002. pp. 139-145. vol. 137, Issue 2.

Huneault, M., et al., "A Survey of the Optimal Power Flow Literature," Power Systems, IEEE Transactions. Aug. 6, 2002. pp. 762-770. vol. 6, Issue 2.

Jiang, Q., et al., "Interior-point Optimal Power Flow With the High Voltage Direct Current Transmission System," Proceeding of the CSEE. 2009. pp. 43-49. vol. 29, Issue 25.

Lu, C. N., et al., "The Incorporation of HVDC Equations in Optimal Power Flow Methods Using Sequential Quadratic Programming Techniques," Power Systems, IEEE Transactions. Aug. 6, 2002. pp. 1005-1011. vol. 3, Issue 3.

Maria, G. A., et al., "A Newton Optimal Power Flow Program for Ontario Hydro EMS," Power Systems, IEEE Transactions. Nov. 12, 2007. pp. 576-582. vol. 2, Issue 3.

Abdel-Moamen, M. A., et al., "Optimal Power Flow Incorporating Facts Devices- Bibliography and Survey," Transmission and Distribution Conference and Exposition, 2003 IEEE PES. Sep. 7-12, 2003. pp. 669-676. vol. 2.

Momoh, J. A., et al., "A Review of Selected Optimal Power Flow Literature to 1993 Part II: Newton, Linear Programming and Interior Point Methods," Power Systems, IEEE Transactions. Aug. 6, 2002. pp. 105-111. vol. 14, Issue 1.

Momoh, J. A., et al, "Challenges to Optimal Power Flow," Power Systems, IEEE Transactions. Aug. 6, 2002. pp. 444-455. vol. 12, Issue 1.

Montcelli, a., et al., "Adaptive Movement Penalty Method for the Newton Optimal Power Flow," Power Systems, IEEE Transactions. Aug. 6, 2002. pp. 334-342. vol. 7, Issue 1.

Pizano-Martinez, A., et al., "Modeling of VSC-Based HVDC Systems for a Newton-Raphson OPF Algorithm," IEEE Transactions on Power Systems. Nov. 4, 2007. pp. 1794-1803. vol. 22, Issue 4.

Qui, Z., et al., "A Literature Survey of Optimal Power Flow Problems in the Electricity Market Context," Power Systems Conference and Exposition, 2009. PSCE '09. IEEE/PES. Mar. 15-18, 2009. pp. 1-6. Seattle, Washington, US.

Scott, B. et al., "Linear Programming for Power-System Network Security Applications," IEEE Transactions on Power Apparatus and Systems. May-Jun. 1979. pp. 837-848. vol. PAS-98, No. 3.

Sun, D. I., et al., "Optimal Power Flow by Newton Approach," IEEE Transaction on Power Apparatus and Systems. Oct. 10, 1984. pp. 2864-2880. vol. PAS-103, No. 10.

Warkad, S.B., et al., "A Genetic Algorithm Approach for Solving AC-DC Optimal Power Flow Problem, " Journal of Theoretical & Applied Information Technology; Jul. 2009. pp. 27. vol. 6, Issue 1.

* cited by examiner

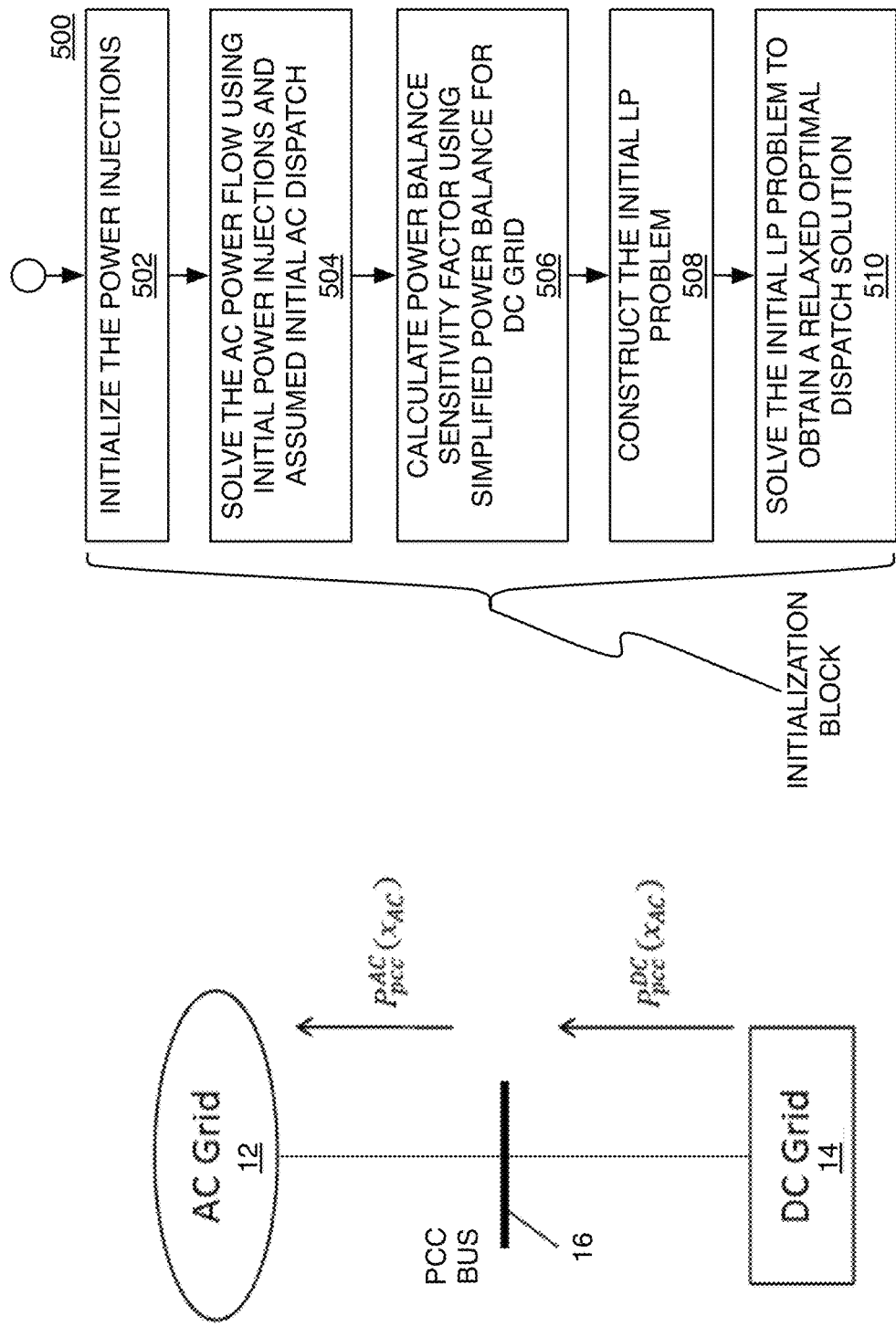

LP PROBLEM
(CORRESPONDING TO LP MODEL 50)

| Controls | | AC Grid Controls | | | | | DC Grid Controls | | | | Lower bound | Upper bound |
|---|---|---|---|---|---|---|---|---|---|---|---|---|
| | Objective Coefficient | G1 | G2 | G3 | ... | GN | P1 | P2 | ... | PN | | |
| | | c1 | c2 | c3 | ... | cn | 0 | 0 | 0 | 0 | | |
| AC grid Line flow constraints | AC1 | | | | | | | | | | F1-LL | F1-UL |
| AC grid Line flow constraints | AC2 | | | | | | | | | | ... | ... |
| AC grid Line flow constraints | ... | | | | | | | | | | ... | ... |
| AC grid Line flow constraints | ACM | | | | | | | | | | ... | ... |
| AC grid Power balance | BAL | | | | | | | | | | ... | ... |
| DC grid power balance | BDL | | | | | | | | | | ... | ... |
| DC grid Line flow constraints | DC1 | | | | | | | | | | ... | ... |
| DC grid Line flow constraints | DC2 | | | | | | | | | | ... | ... |
| DC grid Line flow constraints | ... | | | | | | | | | | ... | ... |
| DC grid Line flow constraints | DCK | | | | | | | | | | ... | ... |
| Upper bound | | G1-UL | ... | | | | | | | | | |
| Lower bound | | G1-LL | ... | | | | | | | | | |

FIG. 4

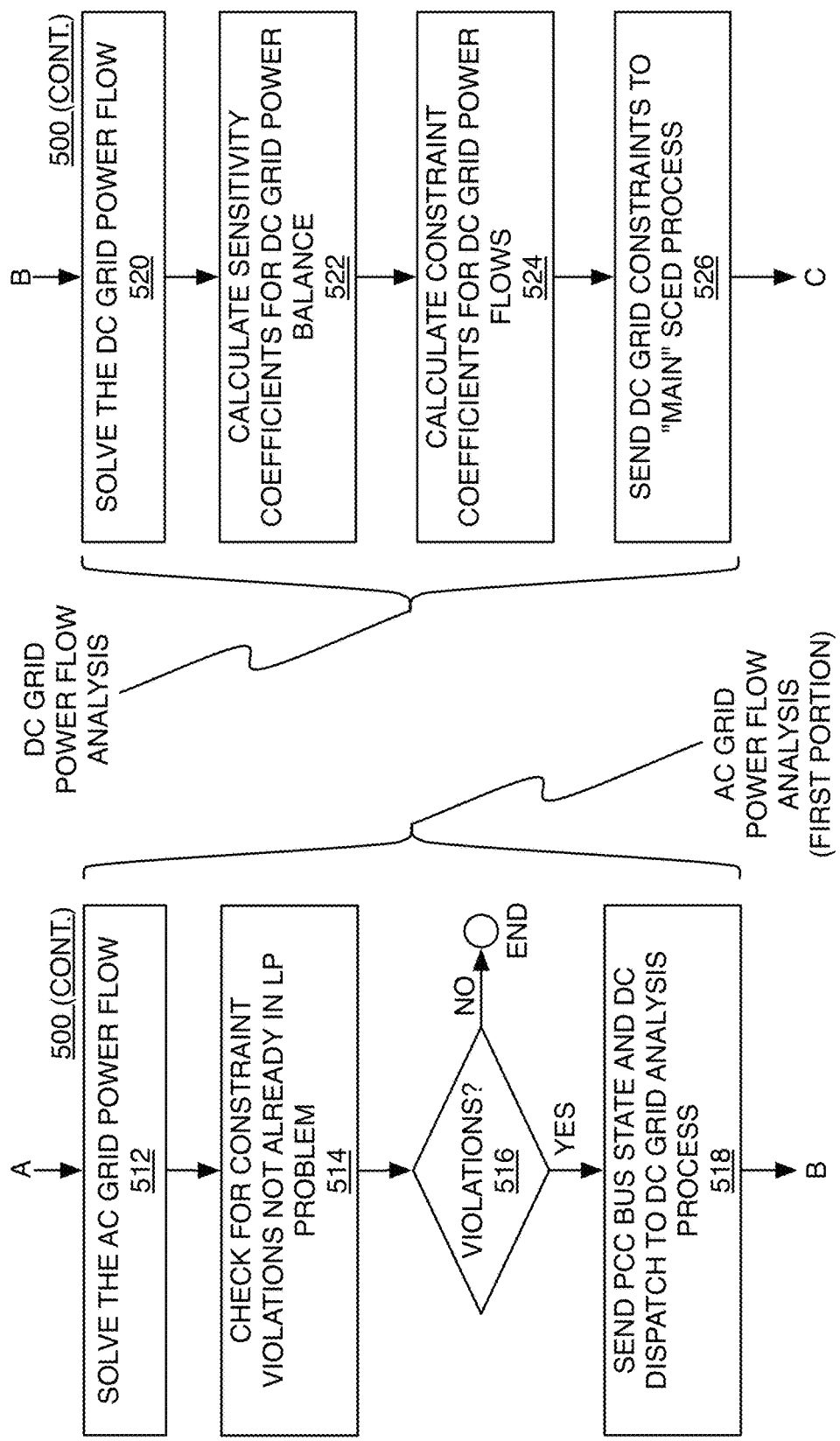

METHOD AND APPARATUS FOR SECURITY CONSTRAINED ECONOMIC DISPATCH IN HYBRID POWER SYSTEMS

TECHNICAL FIELD

The instant application generally relates to Security Constrained Economic Dispatch (SCED) for power transmission systems, and particularly relates to SCED in the context of hybrid power systems including one or more AC grids and one or more High Voltage DC (HVDC) grids.

BACKGROUND

The term "Security Constrained Economic Dispatch" or SCED refers to the process of determining a dispatch solution for generation resources within a power transmission network or system, subject to network constraints such as generation resource constraints, network node voltage and/or phase constraints, transmission line current limits, etc. As a general proposition, SCED determines the lowest-cost dispatch solution while conforming the solution to all applicable constraints and while meeting current or projected demands.

The dispatch solution includes values or settings for some or all of the generation sources within the network, and the SCED process may be run on demand and/or on timed interval basis, e.g., every five or ten minutes. In this manner, the dispatch solution is updated in view of the relevant variables, including changing network conditions regarding demand and/or generation, or in view of changing demand projections.

In an example approach, a network operator maintains or otherwise uses a computer system that is configured to determined dispatch solutions in the SCED context, e.g., based on the computer system gathering, receiving or otherwise having access to the various real-time, historic, and projected values for the subject power system. In a particular example of SCED processing, linear programming provides the mechanism for determining the dispatch solution. See B. Stott, J. L. Marinho, "Linear Programming for Power-System Network Security," IEEE Transactions on Power Apparatus and Systems, pp. 837-848, Vol. PAS-98, No. 3 May/June 1979 (hereafter "Stott").

As those of ordinary skill in the art will appreciate, a linear programming (LP) model includes an objective function to be minimized or maximized, subject to a number of linear inequalities or constraints. Thus, in one sense, LP may be understood as a mathematical method used to determine an optimal allocation of limited resources to competing activities, where the allocation problem is expressed as a linear objective function and corresponding linear inequality constraints. In the power network context, LP optimizes generation values for the power generation sources in the network, in conformance with power demands (customer loading), and various network operating constraints or limits.

Determining constraint conformance generally involves carrying out a power flow analysis (which can be an approximation) for the power network, as a basis for determining voltages, phases, and current flows within the power network. Power flow analysis therefore provides a mechanism for determining a dispatch solution that conforms to the applicable operating constraints and, more broadly, provides a basis for ensuring conformance to the applicable network operating constraints or limits. Power flow analysis the power system context thus forms the foundation of contingency analysis and the implementation of real-time or other dynamic monitoring systems, including SCED systems of interest herein.

Conventional power flow analysis methodologies typically involve determining element values for passive network components, determining locations and values of all complex power loads, determining generation specifications and constraints, and developing or otherwise using a mathematical model describing power flow in the subject network. The power flow analysis procedure then solves for the voltage profile of the network, solves for the power flows and losses in the network, and checks for constraint violations.

Power flow analysis and, in general, SCED processing becomes even more complex for hybrid AC and high voltage direct current (HVDC) systems, e.g., where the DC system is meshed. While there are known approaches for determining power flows in hybrid networks, known approaches include a number of issues or disadvantages.

For example, the power flow solution may depend on detailed DC grid modeling, which exposes proprietary modeling information. In other instances, processing is incomplete, e.g., one or more of the following items are not considered in the model: converter losses associated with voltage conversion between the AC and DC power systems or grids; control laws; grounding schemes, and bipole configurations. In still other instances, key elements are simplified, e.g., only two-terminal DC links are considered, etc. Other approaches require a much more complex simultaneous optimization of the AC and DC grids involved in the hybrid system. Sequential Gradient Restoration Algorithms (SGRA) and Genetic Algorithms are example approaches to the simultaneous grid solution problem.

SUMMARY

The teachings herein disclose an advantageous method and apparatus for performing Security Constrained Economic Dispatch (SCED) for a hybrid power system that includes one or more AC grids interconnected with one or more multi-terminal High Voltage DC (HVDC) grids. The solution is obtained according to a non-linear problem that is optimized, based on successively approximating both the objective function $f$ and the constraints as piecewise linear problems that are solved via linear programming (LP). The LP model is advantageously augmented with a DC grid portion in a manner that accounts for the effects of the DC grid on the AC grid, but which does not require exposing proprietary DC grid modeling details, and which conforms the resultant SCED solution to all applicable AC and DC grid constraints, including AC grid line flow constraints, AC grid power balance constraints, DC grid line flow constraints, and DC grid power balance constraints.

In one embodiment, a processing node is configured to implement a method of determining an SCED solution for a hybrid power system. The processing node comprises, for example, a server or other networked computer system that includes a processing circuit configured to implement the contemplated method, which includes optimizing a non-linear objective function. The optimization is subject to a set of constraints that include AC grid constraints and DC grid constraints, and is based on determining the SCED solution using successive linear approximation.

Such processing includes computing a power balance sensitivity for the AC grid, based on calculating AC grid power flow according to a reasonably assumed dispatch solution and initialized power injection values for the PCC buses, and determining an initial dispatch solution by solving an LP problem that linearly approximates the non-linear objective function, subject to a limited subset of the constraints and based on assumed power injection values. From there, processing continues with adopting the initial dispatch solution as the SCED solution when the initial dispatch solution does not result in any new constraint violations, as determined by performing an AC grid power flow analysis according to initial dispatch solution, and otherwise performing an LP problem iteration.

Each LP problem iteration includes calculating DC grid power flow in a DC grid power flow analysis, based on the injection values included in the current dispatch solution—which in the first iteration is the initial dispatch solution—and correspondingly updating the DC grid constraints in the LP problem. The LP problem iteration further includes solving the updated LP problem and adopting the resulting dispatch solution as the SCED solution if no new AC grid constraint violations are detected from repeating the AC grid power flow analysis, and otherwise adding a most-violated one of any newly-detected AC grid constraints to the LP problem and performing another LP problem iteration.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 is a schematic diagram of an AC grid in a hybrid power system connected to a DC grid in the hybrid power system via a common coupling bus, with annotations for the corresponding power flows.

FIG. 4 is a table illustrating an example LP problem, in terms of its decision variables and its grid constraints.

FIGS. 5A, 5B, 5C and 5D are logic flow diagrams illustrating various portions of one embodiment of a method of SCED processing for a hybrid power system.

DETAILED DESCRIPTION

This disclosure provides example implementations for a successive linear programming (LP) method of determining a Security Constrained Economic Dispatch (SCED) solution for hybrid power systems that include one or more AC grids and one or more multi-terminal meshed High Voltage DC (HVDC) grids. Unless otherwise noted herein, the term "DC grid" will be understood as referring to a multi-terminal HVDC grid.

Figure 1:
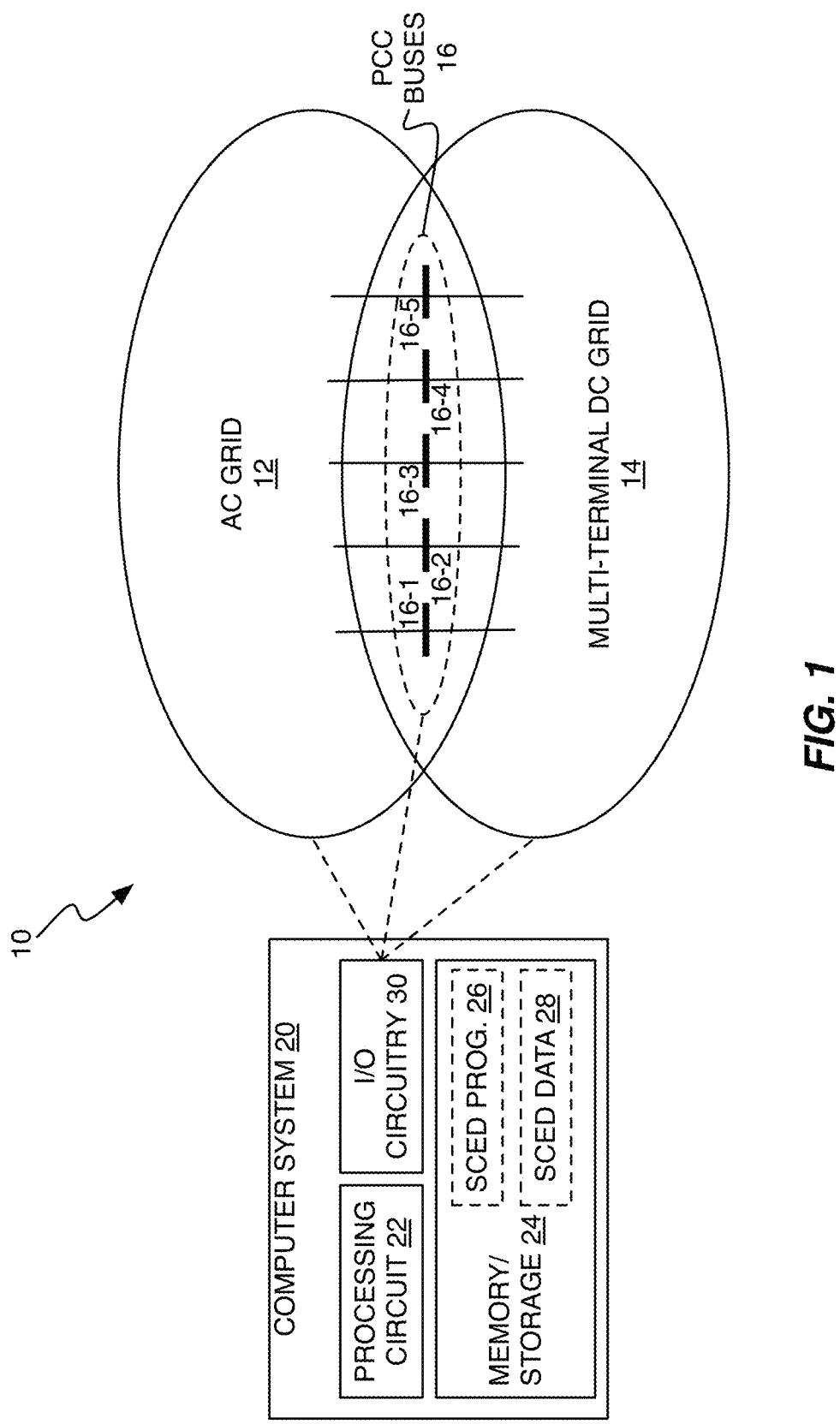
FIG. 1 is a simplified block diagram of one embodiment of a hybrid power system, which includes an AC grid and a multi-terminal HVDC grid, and for which a successive linear-programming based approach to Security Constrained Economic Dispatch (SCED) is taught herein.

FIG. 1 illustrates one example of a hybrid power system 10, including an AC grid 12 and a DC grid 14. The AC grid 12 and the DC grid 14 are connected through Points of Common Coupling (PCC) buses 16. As a non-limiting example of the multi-terminal configuration contemplated herein, five PCC buses 16 are illustrated as PCC bus 16-1, PCC bus 16-2, and so on. While one AC grid 12 and one DC grid 14 appear in the illustration, the hybrid power system 10 may include multiple AC grids 12 and/or multiple DC grids 14, and the teachings herein are directly applicable to hybrid power systems 10 with more than one AC grid 12 and/or DC grid 14. Further, in one or more embodiments, the DC grid 14 comprises a DC grid, which can have two or more terminals, and which can have a radial or a meshed network topology.

Still further, while not shown in FIG. 1, the PCC buses 16 correspond to Voltage Conversion Stations (VCSs), where each such "station" provides conversion from AC to DC power and/or from DC to AC power. Consequently, the AC grid 12 and the DC grid 14 may be regarded as overlapping at the PCC buses 16 and this overlap is suggested in FIG. 1.

Figure 2:
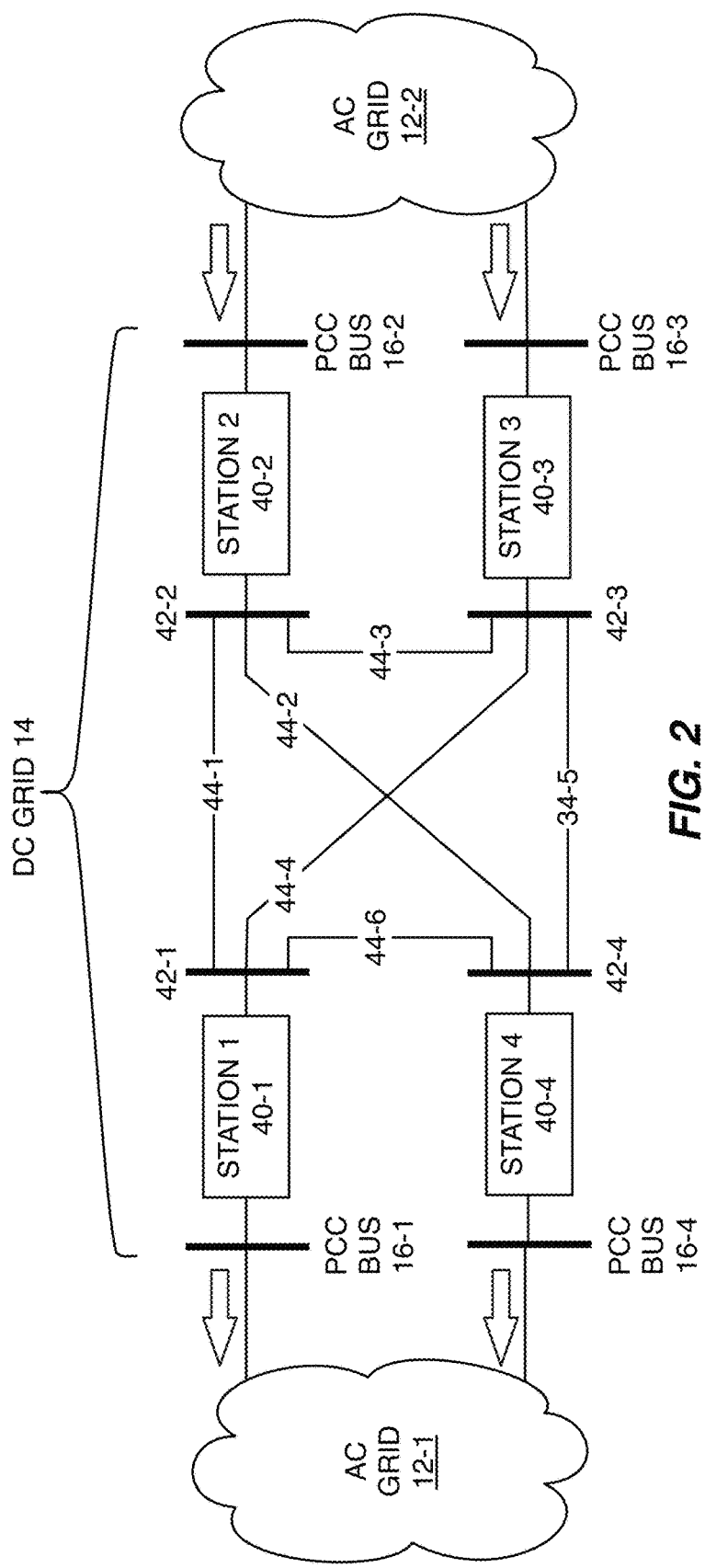
FIG. 2 is a simplified block diagram providing further example details for the DC grid portion of the hybrid power system introduced in FIG. 1.

FIG. 2 provides a better illustration of the above arrangement, by depicting a number of VCSs 40 corresponding to respective ones among a number of PCC buses 16. In particular, VCS 40-1 ("STATION 1") is connected between the PCC bus 16-1 and the DC grid bus 42-1, VCS 40-2 ("STATION 2") is connected between the PCC bus 16-2 and the DC grid bus 42-2, VCS 40-3 ("STATION 3") is connected between the PCC bus 16-3 and the DC grid bus 42-3, and VCS 40-4 ("STATION 4") is connected between the PCC bus 16-4 and the DC grid bus 42-4.

Two AC grids 12 are depicted, including AC grid 12-1 and AC grid 12-2. These suffixes are used for clarity when helpful. Otherwise, it will be understood that the phrase "DC grid 12" and "DC grids 12" are used herein for generic singular and plural references to a DC grid or grids. Using that protocol, FIG. 2 illustrates that the PCC buses 16-1 and 16-4 represent the AC/DC grid interface between the DC grid 14 and the AC grid 12-1, while the PCC buses 16-2 and 16-3 represent the AC/DC grid interface between the DC grid 14 and the AC grid 12-2. In the depicted configuration, power flows from the AC grid 12-2 to the AC grid 12-1, through the DC grid 14. However, the depicted arrangement is merely an example and power may flow in the reverse direction, or otherwise change direction as needed, based on the bidirectional conversion capabilities of the VCSs 40. The VCSs 40 are implemented, for example, as bipole or monopole stations.

FIG. 3 illustrates an example case of the power flow between the AC grid 12 and the DC grid 14, which is possible through a given PCC bus 16. In the illustrated example, power flow from the DC grid 14 into the PCC bus 16 is represented as $P_{pcc}^{DC}(x_{AC})$ and power flow from the PCC bus 16 into the AC grid 12-1 or 12-2 is represented as $P_{pcc}^{AC}(x_{AC})$. The example here is non-limiting and those of ordinary skill in the art will understand that power flow is bi-directional—i.e., power may flow from an AC grid 12 into the DC grid 14 through the PCC bus 16, or may flow in the opposite direction.

Among its many advantageous aspects the method and apparatus taught herein provide SCED solutions that inherently address the complexities and concerns raised with real-world VCSs 40 which join AC grids 12 with DC grids 14 together in a hybrid power system 10. In one example, the SCED solution generation taught herein accommodates detailed converter modeling, e.g., modeled losses based on actual conversion physics that include converter transformer resistance and other converter losses, and further accommodates various VCS grounding schemes, droop control, etc. Such advantages make practical the extension of LP solutions to the hybrid power system 10 illustrated in FIG. 1 and to other arrangements including an essentially arbitrary number of AC grids 12, DC grids 14, and PCC buses 16 interconnecting them in a multi-terminal arrangement.

The contemplated SCED solution approach is achieved through network decomposition and distributed design. The approach enables, for example, an extension of AC-only LP approaches to hybrid power systems 10, which include one or more multi-terminal DC grids, based on processing the DC grid(s) 14 separately and treating them as multi-terminal black boxes in the overall LP solution. The disclosed approach includes separate modeling of DC grid(s) 14 from the "overall" SCED process, provides protection of proprietary DC grid model and control details, and retains the performance advantages of successive LP-based SCED solutions. Still further, because of the separation of the DC grid(s) 14 from the overall analysis, no changes are necessary to the disclosed SCED method with respect to future DC grid technology changes.

With respect to implementing the contemplated SCED method, such processing is implemented, for example, in the computer system, such as the computer system 20 introduced in FIG. 1. The computer system 20, also referred to as "processing node 20," can be understood as an apparatus comprising a server or other computer that is configured according to the execution of stored computer program instructions. In one or more embodiments, the computer system 20 includes a processing circuit 22 and associated memory/storage 24, e.g., storing an SCED program 26 and SCED data 28. The computer system 20 may further comprise Input/Output (I/O) circuitry 30 (also referred to as interface circuitry 30), e.g., for obtaining real-time or near real-time operating parameters for the hybrid power system 10, such as bus voltages, phases, and power injections, etc.

The processing circuit 22 may comprise multiple processing circuits, e.g., one or more microprocessor-based circuits. Similarly, the memory/storage 24 may comprise any mix of volatile and non-volatile memory and/or storage devices, such as DRAM for working memory, and FLASH or disk storage. At least some of the SCED data 28 may be obtained through the interface circuitry 30 from monitoring systems or devices associated with the hybrid power system 10. Additionally, or alternatively, some or all of the SCED data 28 may be provided to the computer system 20 by one or more other computer systems (not shown) that are associated with running and/or monitoring the hybrid power system 10, or the SCED 28 may be obtained by the computer system 20 accessing one or more databases accessible to it.

The particulars of how the SCED data 28 is obtained (and updated or otherwise maintained) is not germane. Of more interest is that the SCED data 28 represents operational and configuration information needed to perform the contemplated SCED solution determination, e.g., voltage, phase, and other operating parameters for the hybrid power system 10. In turn, the SCED program 26 comprises a computer program that, when executed by the processing circuit 22, configures the processing circuit 22 to solve an LP problem which produces the SCED solution, for dispatching to the control system(s) associated with the hybrid power system 10.

For simplicity of notation, an embodiment of the contemplated SCED dispatch method is described for one multi terminal DC grid 12 and only real power control is used in the LP problem formulation. For hybrid power systems 10 involving more than one DC grid 12, the DC grid analysis process is performed for each of the DC grids 12 and the overall LP problem is augmented to include the control and constrains for all of the DC grids 12.

The SCED problem is non-linear and may be represented as an non linear program (NLP) problem in the form of an objective function to be minimized $$\min_u f(x, u)$$

$$\text{subject to}$$

$$h(x) = 0$$

$$g(x) \leq 0, \text{ and}$$

$$u^{min} \leq u \leq u^{max}.$$

In the above formulation, the goal is to minimize the objective function $f$, subject to a number of constraints. With its given formulation, minimizing the above objective function can be understood as optimizing it. The objective function may be formulated differently, such that optimization is based on maximizing it. In either case, it should be understood that "optimizing" the objective function means performing a practical or real-world mathematical optimization, subject to all applicable constraints, including limits on computational iterations and other reasonable and/or practical convergence considerations, as well as limitations on computational precision.

In any case, in the above formulation of the objective function, u is the vector of decision variables, which contains the controllable generation sources in the AC grid 12 and the PCC power injections from/to the DC grid 14. The term x represents the vector of state variables for the AC and DC grids 12 and 14. For the AC grid 12, these state variables include the voltage magnitudes and phase angles of the AC buses. For the DC grid 14, the state variables include the voltage magnitude and phase angle for the AC buses existing in the DC grid 14 on the DC-grid-side of the PCCs 16, and the DC voltage for the DC buses. Further, h(x)=0 is the vector of equations for power flow in both the AC grid 12 and the DC grid 14, and g(x)≤0 is the vector of inequality constraints in the both the AC grid 12 and the DC grid 14. Finally, $u^{min}$ and $u^{max}$ are the lower and upper limits of the decision variables u.

The AC and DC grids 12 and 14 are decomposed at their points of common coupling—i.e., at the PCC buses 16. The contribution of DC grid 14 is modeled as equivalent power injections into the AC grid 16. The DC grid 14 is represented by a successively refined linear model that includes the DC grid power balance equation and the inequality constraints for the DC branch power flows within the DC grid 14.

Determining the SCED solution—i.e., determining the dispatch for the hybrid power system 10—is based on optimizing the non-linear objective function $f$, subject to a set of constraints that include AC grid constraints and DC grid constraints, using successive linear approximations. To do so, the AC grid 14 is modeled by a successively refined power balance equation and a small set of constraints that are identified during an initial solution of a "relaxed" economic dispatch problem. To continue the example explanation using a more convenient notation, let NG—number of controllable generation buses,
G—AC grid controllable generation vector,
$G_i$—controllable generation i,
$G_i^{max}$—Upper limit of controllable generation i,
$G_i^{min}$—Upper limit of controllable generation i,
NPCC—number of PCC buses,
P—vector of real power injection from DC grid into AC grid at PCC buses, $P^{(k)}$—vector of real power injection from DC grid into AC grid at PCC buses at iteration k, $P_j$—PCC bus real power injection to AC grid i, $P_i^{max}$—Upper limit of controllable generation i, and $P_i^{min}$—Lower limit of controllable generation i.

The cost function of each generator in the objective function $f$ is approximated by a piecewise-linear representation $$f(x,u) \approx \Sigma_i^{NG} \Sigma_j^m c_{i,j} p_{i,j} \quad (1)$$

where $p_{i,j}$ is the jth segment of power output of the ith generator; $c_{i,j}$ is the dispatch cost of the corresponding power output segment. The total power output from the ith generator the summation over its m segments, $G_i = \Sigma_j^m p_{i,j}$. The AC grid power balance equation is $$f_{AC,P}(G,P) = 0.$$

Correspondingly, the DC grid power balance equation $$f_{DC,P}(P) = 0.$$

Now, let [G(0)], [P(0)] be the most recent LP problem solution, and the linearized power balance equations are given as $$f_{AC,P}(G(0),P(0)) + S_G^{ACP}(G-G(0)) + S_{PCC}^{ACP}(P-P(0)) = 0 \quad (2)$$

$$f_{DC,P}(P(0)) + S_{PCC}^{DCP}(P-P(0)) = 0 \quad (3)$$

where $S_G^{ACP}$—sensitivity factor of AC grid power balance with respect to controllable generations, $S_{PCC}^{ACP}$—sensitivity factor of AC grid power balance with respect to PCC bus injections, $S_{PCC}^{DCP}$—sensitivity factor of DC grid power balance with respect to PCC bus injections, $S_G^{ACP} = [S_{G_1}^{ACP}, S_{G_2}^{ACP}, \ldots, S_{G_{NG}}^{ACP}]$, for generation sources $G_1, \ldots, G_{NG}$, $$S_{PCC}^{ACP} = [S_{PCC_1}^{ACP}, S_{PCC_2}^{ACP}, \ldots, S_{PCC_{N_{PCC}}}^{ACP}],$$

for PCC buses $PCC_1, \ldots, PCC_{N_{PCC}}$, and $$S_{PCC}^{DCP} = [S_{PCC_1}^{DCP}, S_{PCC_2}^{DCP}, \ldots, S_{PCC_{N_{PCC}}}^{DCP}],$$

for PCC buses $PCC_1, \ldots, PCC_{N_{PCC}}$.

These sensitivities can be calculated by any one of several commonly practiced methods, which are known to persons of ordinary skill in the power transmission and distribution arts.

Regarding the branch flow constraints, let NACB represent the number of AC grid branches in the AC grid 12, and NDCB represent the number of DC grid branches in the DC grid 14. Consider first the power flow constraints on a branch in the AC grid 12

$f_{ACB}$—power flow on a branch in the AC grid, $f_{ACB}^{max}$—upper limit for a AC grid branch flow, $f_{ACB}^{min}$—lower limit for a AC grid branch flow, thus $f_{ACB}^{MIN} \leq f_{ACB,i} \leq f_{ACB}^{max}$ These constraints are represented by $$f_{ACB}^{min} \leq f_{ACB}(G)(0),P(0)) + S_G^{ACB}(G-G(0)) + S_{PCC}^{ACB}(P-P(0)) \leq f_{ACB}^{max} \quad (4)$$

where $S_G^{ACB}$—sensitivity factor of AC grid branch flow with respect to controllable generation, $S_{PCC}^{ACB}$—sensitivity factor of AC grid branch flow with respect to PCC bus injection, $$S_G^{ACB} = [S_{G_1}^{ACB}, S_{G_2}^{ACB}, \ldots, S_{G_{NG}}^{ACB}], \text{ and}$$

$$S_{PCC}^{ACB} = [S_{PCC_1}^{ACB}, S_{PCC_2}^{ACB}, \ldots, S_{PCC_{N_{PCC}}}^{ACB}].$$

Similarly, for the DC grid branch constraints, consider the power flow on a branch in the DC grid 12 (the branch can be an AC branch or a DC branch)

$f_{DCB}$—power flow on a branch in the DC grid, $f_{DCB}^{max}$—upper limit for a DC grid branch flow, $f_{DCB}^{min}$—lower limit for a DC grid branch flow, and $f_{DCB}^{min} \leq f_{DCB} \leq f_{DCB}^{max}$.

These constraints are expressed as $$f_{DCB}^{min} \leq f_{DCB}(G(0),P(0)) + S_{PCC}^{DCB}(P-P(0)) \leq f_{DCB}^{max}, \quad (5)$$

where $S_{PCC}^{DCB}$—sensitivity factor of DC grid power balance with respect to PCC bus injection.

FIG. 4 illustrates an example of the contemplated LP problem, which is presented in the form of a matrix or chart that depicts columns corresponding to the decision variables at issue in the objective function $f$, along with a first row representing the objective-function coefficients corresponding to the decision variables, and additional rows representing the various AC grid line flow and power balance constraints for the AC grid 12, and the various DC grid line flow and power balance constraints for the DC grid 14. One also sees entries for the applicable upper and lower bounds.

The matrix would, of course, be expanded for considering more than one AC grid 12 and/or DC grid 14. Further, those of ordinary skill in the art will recognize that the decision variables related to the AC grid 12, e.g., G1, G2, and so on, represent AC grid generation sources. Correspondingly, the decision variables related to the DC grid 14 comprise injections P1, P2, and so on. It will be appreciated that a generation source in the AC grid 12 generally will be zero or greater and generally will be constrained by minimum and maximum values (upper and lower limits). Similar bounds may apply to the individual injections P1, P2, and so on, however it will be appreciated that power injection is bidirectional. For example, the power injection through a given PCC bus 16 may represent power flow from the DC grid 14 into the AC grid 12, or power flow from the AC grid 12 into the DC grid 14.

For efficient optimization and easy integration with existing SCED application program designed without the contemplated consideration of multi-terminal DC grids 14, the below-described method is used to solve the SCED problem for a hybrid power system 10, using an LP problem such as that exemplified in the matrix of FIG. 4. It will be understood that the LP problem does not initially consider all possible constraints and that the contemplated processing incrementally introduces new constraints into the LP problem in an innovative and advantageous manner that addresses both AC grid and DC grid constraints.

In one embodiment, the processing node 20 is configured to implement a method of determining an SCED solution for a hybrid power system. The processing node 20 includes, as noted, the processing circuit 22, which here is configured to implement a contemplated SCED solution method. The method optimizes a non-linear objective function representing the overall SCED problem and is subject to a set of constraints that include AC grid constraints and DC grid constraints.

The optimization is carried out using successive linear approximation, and the supporting processing includes computing a power balance sensitivity for the AC grid 12, based on calculating AC grid power flow according to a reasonably assumed dispatch solution and initialized power injection values for the PCC buses 16, and determining an initial dispatch solution by solving an LP problem that linearly approximates the non-linear objective function. The solution is subject to a limited subset of the constraints and based on assumed power injection values. From there, processing continues with adopting the initial dispatch solution as the SCED solution when the initial dispatch solution does not result in any new constraint violations, as determined by performing an AC grid power flow analysis according to initial dispatch solution, and otherwise performing an LP problem iteration.

Each LP problem iteration includes calculating DC grid power flow in a DC grid power flow analysis, based on the injection values included in the current dispatch solution—which in the first iteration is the initial dispatch solution—and correspondingly updating the DC grid constraints in the LP problem. The LP problem iteration further includes solving the updated LP problem and adopting the resulting dispatch solution as the SCED solution if no new AC grid constraint violations are detected from repeating the AC grid power flow analysis, and otherwise adding a most-violated one of any newly-detected AC grid constraints to the LP problem and performing another LP problem iteration.

Figure 5D:
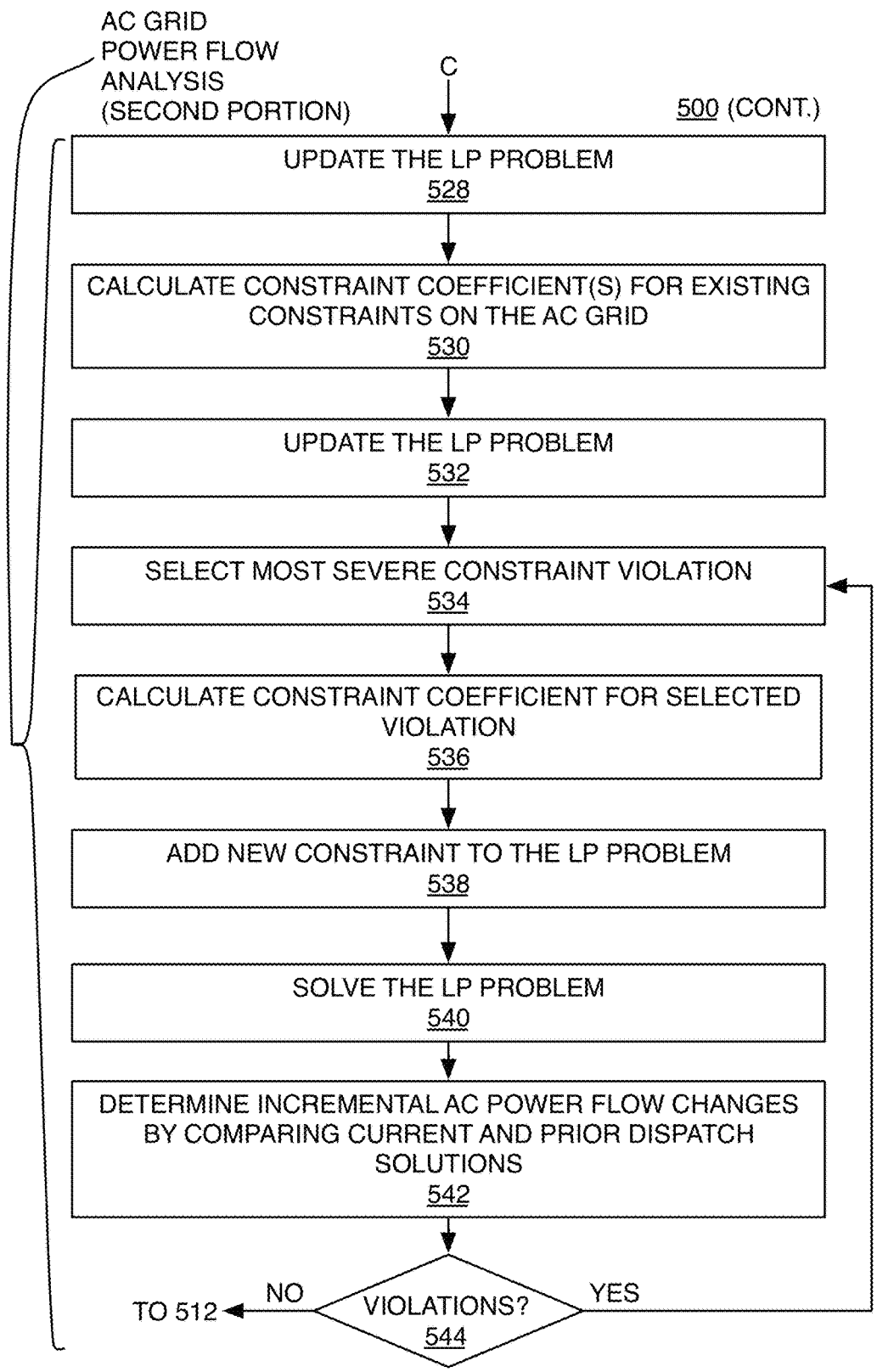

With respect to the above method, initial processing may be regarded as performing an "initialization block" of processing steps or actions, such as shown in FIG. 5A, which introduces such initialization in the context of an overall method 500 shown in FIGS. 5A, 5B, 5C and 5D. It will be understood that the method 500 may be implemented via dedicated, fixed hardware and/or at least partially implemented via programmed processing circuitry. In at least one embodiment, the method 500 is embodied as a computer program stored in a computer-readable medium—e.g., SCED program 26 introduced in FIG. 1.

Example computer-readable mediums include but are not limited to a magnetic storage disk, a solid-state-drive (SSD), FLASH, EEPROM, or other persistent storage device. In such embodiments, execution of the computer program by a computer system implements the method 500. As suggested by the illustration of the computer system 20 in FIG. 1, the example computer system includes a CPU and supporting circuitry, for program execution. The example computer system further includes related input/output (I/O) circuitry, for retrieval of the stored computer program, and for retrieving and outputting signaling (control and/or data), for performing the contemplated SCED processing in conjunction with operation of the hybrid power system 10.

Before delving into the logic flow diagram itself, it will be appreciated that the method 500 determines an SCED solution for the hybrid power system 10 and it is helpful to regard the method as having an initialization or LP problem construction portion, a first portion of an AC grid power flow analysis, a DC grid power flow analysis, and a second portion of the AC grid power flow analysis. The method may execute once, if an initially-assumed dispatch solution is determined not to result in any constraint violations, or it may iterate any number of times, to find an optimized dispatch solution (subject to limit counters, convergence tests, etc., as are known in the computer programming arts).

The initialization portion of the method 500 includes constructing an LP problem to optimize the piecewise linear objective function, which includes first decision variables representing AC generation sources in the AC grid 12 and second decision variables representing power injections that model interaction between the AC and DC grids 12 and 14 at the PCC buses 16. In the chart of FIG. 4, the Gs represent the first decision variables and the Ps represent the second decision variables. Moreover, the rows in that same chart represent a number of AC and DC grid constraints, including an AC grid power balance constraint, AC generation source constraints, AC grid power flow constraints, power injection constraints, a DC grid power balance constraint, and DC grid power flow constraints. The constraints are operative to constrain the objective function $f$ in the LP-based optimization.

Initialization in an example implementation includes setting the second decision variables to initial values, assuming an initial AC dispatch solution that sets initial AC generation values for the first decision variables, and solving an AC grid power balance equation according to the initial values of the second decision variables and the initial AC dispatch solution, to determine initial AC grid power flows. That is, the example implementation includes initializing the AC power generations and the initial PCC bus injections. The example initialization further includes constructing an initial LP problem based on the resulting initial AC grid power flows and further based on power balance sensitivity factors determined using a simplified power balance equation for the DC grid, which ignores all DC grid loss in the initial DC grid power balance constraint.

In one implementation, the linear representations for all of the DC branch constraints are included in the initial LP due to the small number of DC branches. In an alternate implementation, the DC branch constraints are not included initially, but are added during iterative processing when violations are detected. Further, the example initialization portion of the method 500 includes solving the initial LP problem to obtain a relaxed optimal dispatch solution for the hybrid power system. The solution of the initial LP problem provides update values for the dispatch variables for the AC grid(s) 12 and the PCC power injection variables in the DC grid(s) 14.

From there, the method 500 continues with invoking a first portion of an AC grid power flow analysis with the initial LP problem as a current LP problem and the relaxed optimal dispatch solution as a current dispatch solution. In an example implementation, the first portion of the AC grid power flow analysis includes solving for AC grid power flows arising from the current dispatch solution and checking for any new violations corresponding to AC grid constraints not already included in the current LP problem.

The first portion of the AC grid power flow analysis includes terminating the method 500 and adopting the current dispatch solution as a final SCED solution for the hybrid power system 10, in the event that no new violations are identified. Otherwise, the method 500 includes invoking a DC grid power flow analysis in the event that one or more new violations are identified. Here, a "new violation" is a constraint violation for a constraint that is not already included in the LP problem.

In an example implementation, the DC grid power flow analysis includes solving for DC grid power flows based on PCC bus states and DC dispatch values known from the current dispatch solution, and calculating sensitivity coefficients for the DC grid power balance from the DC grid power flows and correspondingly calculating constraint coefficients for the DC grid power flows. These DC grid constraint sensitivities are sent back to the invoking procedure. From there, the method 500 continues with invoking a second portion of the AC grid power flow analysis.

In an example implementation, the second portion of the AC grid power flow analysis includes updating DC constraints in the current LP problem with the sensitivity and constraint coefficients calculated in the DC grid power flow analysis and then updating the AC constraints with constraint coefficients calculated for the existing constraints included in the current LP problem for the AC grid. The current LP problem is further updated with branch flow sensitivities calculated for the AC grid 12 using the AC generation values in the current dispatch solution.

The second portion of the AC grid power flow analysis further includes selecting the most severely violated constraint from among any one or more new violations identified for the AC grid constraints. Here, these new violations are violations of constraints that are in the larger non-linear SCED problem being solved, but not already included in the current LP problem. Processing continues with calculating a corresponding constraint coefficient for the newly selected constraint and adding the corresponding constraint coefficient to the current LP problem. From there, the second portion of the AC grid power flow analysis of the method 500 continues with solving the current LP problem and checking for new violations for the AC grid constraints. In the event that one or more new violations are identified for the AC grid constraints, processing returns to the point in the second portion of the AC grid power flow analysis for selection of the most severely violated constraint from among any new AC grid constraint violations that are identified. However, in the event that no new violations were identified, processing returns to the first portion of the AC grid power flow analysis.

This subsequent execution of the first portion of the AC grid power flow analysis will either result in outputting a final SCED solution, or will result in a next invocation of the DC grid power flow analysis, which in turn will result in a next invocation of the second portion of the AC grid power flow analysis. One sees therefore that multiple iterations of the method 500 may be performed and that each such iteration advantageously prevents DC grid constraint violations.

The method 500 may also include outputting the final SCED solution or control signaling derived from the final SCED solution, for implementation in the hybrid power system 10. Further, the method 500 in some embodiments includes setting the second decision variables to initial values using two or more different values that reflect differences in power conversion costs or preferences among the PCC buses 16. Additionally or alternatively, initializing the second decision variables comprises setting them to one or more non-zero values reflecting generation or loading in the DC grid 14 at corresponding ones of the PCC buses 16.

Regardless of such variations, in at least one embodiment of the method 500, invoking the DC grid power flow analysis comprises invoking a software component and includes providing the PCC bus states and the DC dispatch values known from the current dispatch solution as arguments to the software component. This modularized implementation embodiment further includes returning, to the second portion of the AC grid power flow analysis, the sensitivity coefficients and the constraint coefficients as return values of the software component.

With the above overview of the method 500 in mind, the discussion turns to the example embodiment of the method 500 as set forth in the logic flow diagrams of FIGS. 5A, 5B, 5C, and 5D. Operations begin in FIG. 5A with the "initialization block" of processing operations, starting with initializing (Block 502) the power injections corresponding to the PCC buses 16. Some embodiments use the simplifying assumption that the power injections from the VCSs 40 are zero. Of course, it is also contemplated in some embodiments to allow one or more of the injection values to be initialized to a non-zero value. Non-zero values reflect generation or loading in the DC grid 14 at corresponding ones of the PCC buses 16.

Processing continues with solving (Block 504) for the AC power flows in the AC grid 12. The power flow calculations rely on the initialized power injections and on an assumed initial AC dispatch—i.e., an assumed set of values for the AC generation sources in the AC grid 12 that are reasonable with respect to the known constraints on those sources. From there, processing continues with calculating (Block 506) the sensitivity factor of the grid power balances by using any one of several commonly practiced methods that are known to persons of ordinary skill in the power transmission and distribution arts. The power balance equation for the DC grid 14 is trivially included in such processing, for example, by setting sensitivity of all generators with respect to the slack generator to −1.

Then, in Blocks 508 and 510, the initial LP is constructed, in which the controllable DC grid dispatch is zeroed—i.e., the power injections into the AC grid 12 are all set to zero. With this setup, the initial LP problem is solved to obtain an initial dispatch solution for the hybrid power system 10 that is referred to as a "relaxed" optimal dispatch solution.

In turn, the relaxed optimal dispatch solution provides a basis for recalculating AC power flows in view of the generation settings included in the relaxed optimal dispatch. Thus, turning to FIG. 5B, one sees an AC grid power flow analysis that solves AC power flows in the AC grid 12 using the relaxed optimal dispatch solution on this first pass through the overall method 500, although any subsequent iterations will use an updated LP problem.

The AC grid power flow analysis includes solving (Block 512) the AC grid power flow in view of the AC generation source settings in the "current" LP problem. As noted, in the initial iteration, the current LP problem is the relaxed optimal dispatch, and in each subsequent iteration, if any, the current LP problem is the most recently updated LP problem.

The analysis continues with checking (Block 514) for new constraint violations in the AC grid 12, where a "new" violation refers to a constraint that is not already included in the LP problem. These checks include determining whether any AC power flows in the AC grid 12 violate the constraints associated with those flows—i.e., limit violation checking. If no new violations are detected (NO from Block 516), the dispatch solution as determined by the current LP problem is considered as the SCED solution to be output by the method 500.

However, if there are one or more new violations, processing continues with adding the constraints associated with the new violation(s) to the LP problem and sending (Block 518) the current PCC bus states and corresponding DC dispatch values for the VCSs 40 to a DC grid power flow analysis, as shown in FIG. 5C.

The DC grid power flow analysis can be understood as an innovative mechanism that reconciles the AC dispatch with the DC dispatch, in the sense that the DC grid power flow analysis updates DC grid constraints as needed, to prevent the overall dispatch processing method 500 from adopting a dispatch solution that violates one or more DC grid constraints. Yet it provides this safeguard in a modularized manner that does not require the AC-side dispatch processing to know or "see" the details of the DC grid flow analysis.

Indeed, the DC grid power flow analysis may be implemented in a modular processing fashion in which the AC-side processing need only be compatible with the data and control exchanges occurring at processing flow points "B" and "C" as shown in FIGS. 5B and 5C. This approach allows the implementation details represented by the DC grid analysis of FIG. 5C to be transparent with respect to the overall method. Such an approach makes it easier to swap or update the DC-side processing for any hybrid power system 10, based on updating the DC grid power flow analysis portion.

In any case, the DC grid power flow analysis begins with solving (Block 520) for the DC power flows in the DC grid 14, based on the dispatch solution represented in the current LP problem. More particularly, the DC power flows are solved based on the PCC bus states and DC dispatch values provided from Block 518 in the "main" or overall process flow. DC grid power flow analysis continues with calculating (Block 522) the sensitivity coefficients for the DC grid power balance equation and calculating (Block 524) constraint coefficients for the DC grid power flows—i.e., the DC branch constraints in the DC grid 12. The DC grid power flow analysis then sends (Block 526) these calculated values back to the main process flow. For example, in one or more embodiments, the information returned to the main process flow at interface point "C" includes sensitivities, row upper and lower limits for the DC branch flows, and PCC power dispatch upper and lower limits. In other words, the DC grid power flow analysis provides updated DC constraint coefficients for updating the current LP problem.

Turning to FIG. 5D for a continuation of the main process flow, one therefore sees that the method 500 updates (Block 528) the current LP problem by updating the coefficients of the DC grid power balance constraints and the DC grid power flow constraints, as calculated in the DC grid power flow analysis of FIG. 5C. Processing then continues with calculating (Block 530) the branch flow sensitivities in the AC grid 12, based on the existing AC grid branch states and the current dispatch power. The AC constraints in the current LP problem are then updated (Block 532) with the constraint coefficients obtained from the recalculation of the branch flow sensitivities in Block 530.

Then, for any newly detected branch flow violations in the AC grid 12, the most severe violation is selected (Block 534) and corresponding constraint coefficients are calculated (Block 536) and the LP problem is updated with the newly selected constraint (Block 538). As before, a "newly" detected constraint is one not already included in the LP problem to constrain optimization of the objective function $f$.

The updated LP problem is solved to obtain an updated dispatch solution (Block 540), which is then considered the current dispatch solution. This current dispatch solution is compared to the previous dispatch solution, as obtained from the prior solving of the LP problem, to determine incremental changes in the AC grid power flows (Block 542). In the first iteration through the method 500, the previous dispatch solution will have been obtained in Block 510—i.e., the relaxed optimal dispatch solution. For any subsequent iteration of the method 500, if performed, the previous dispatch solution will have been obtained in the prior execution of Block 540—i.e., the dispatch solution obtained in the immediately prior iteration. Thus, the difference between the current and previous dispatch solutions provides an efficient mechanism to solve for incremental power flows. The power flows on the branches in the AC grid 12 are estimated—e.g., using linear extrapolation from the previous solution point—and checked for any new constraint violations.

If any constraints detected as being violated are already included in the current LP problem, they are not counted as "new" constraint violations. If no new violations are detected (NO from Block 544), the main processing flow returns to the AC grid power flow analysis in FIG. 5B. If any new constraints are detected (YES from Block 544), processing returns to Block 534, where the most severe (new) constraint violation is selected, and the processing of Blocks 536, 538, 540, 542 and 544 is repeated.

Figure 6:
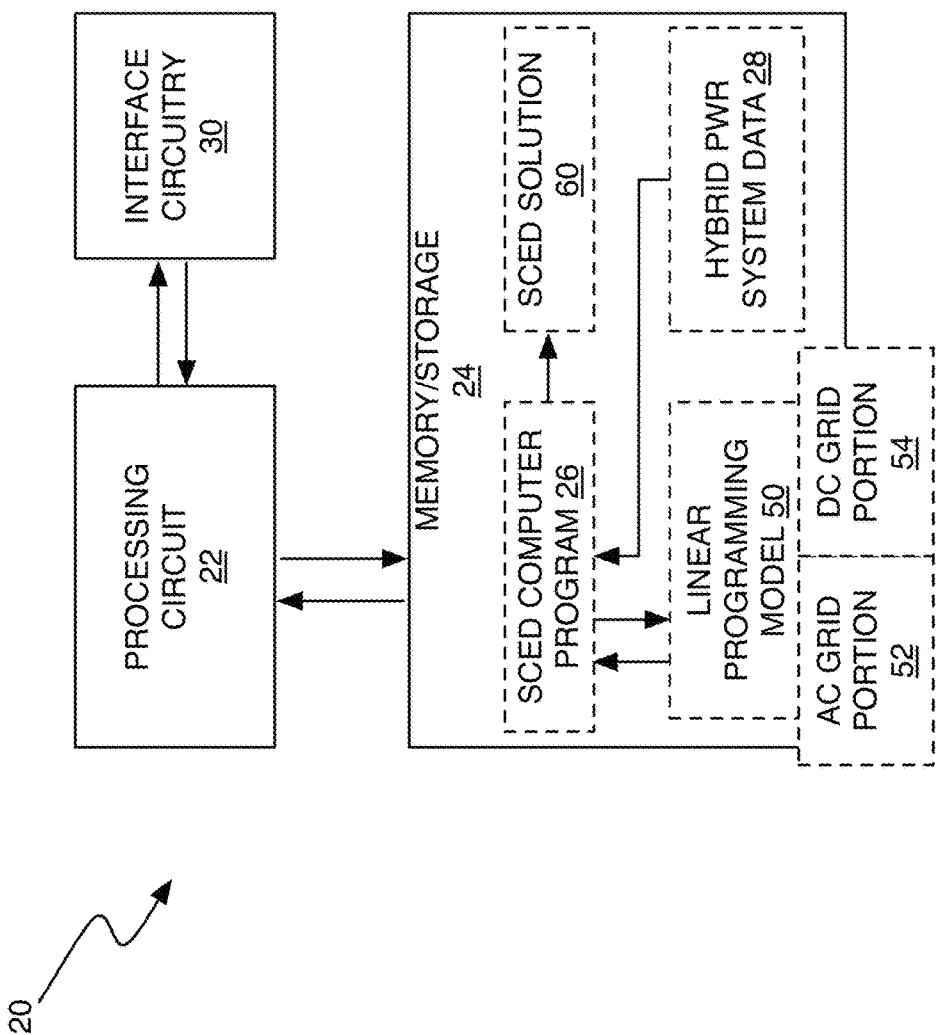
FIG. 6 is a block diagram illustrating one embodiment of a computer system that is configured to perform SCED solution processing, as taught herein for hybrid power systems, and as may implement the method shown in FIGS. 5A, 5B, 5C and 5D.

FIG. 6 provides further example details for the computer system 20 in one embodiment which is configured to carry out the method 500, or variations of it. The computer system 20 includes an LP model 50, which may comprise one or more data structures and/or associated computer program instructions, such as a software object or component. The LP model 50 includes an AC grid portion 52 and a DC grid portion 54. The SCED program 26 can be understood as solving an LP problem that is based on the LP model 50, to determine an SCED solution 60—i.e., an SCED solution for the hybrid power system 10.

Here, the SCED solution 60 represents the finalized solution determined in any given solution interval. For example, the computer system 20 may be configured to compute a new or updated SCED solution 60 on demand, in response to detected triggers, periodically (every five minutes, for example), and so on. It will also be appreciated that the computer system 20 in some embodiments outputs the SCED solution 60 to other equipment or systems, for implementing the SCED solution 60 within the hybrid power system 10, or outputs control signaling to implement the SCED solution 60.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of determining a Security Constrained Economic Dispatch (SCED) solution for a hybrid power system comprising an Alternating Current (AC) grid interconnected with a multi-terminal High Voltage Direct Current (HVDC) grid at two or more Point-of-Common-Coupling (PCC) buses, wherein a control system is in communication with the hybrid power system, the control system including a processing circuit having a processor, the processing circuit being configured to output the SCED solution for implementation in the hybrid power system, the processing circuit configured to optimize a non-linear objective function, subject to a set of constraints that include AC grid constraints and DC grid constraints, for determining the SCED solution using successive linear approximation, the processing circuit configured to perform the following steps of the method:

computing a power balance sensitivity for the AC grid, based on calculating AC grid power flow according to a reasonably assumed dispatch solution and initialized power injection values for the PCC buses;

determining an initial dispatch solution by solving a linear programming (LP) problem that linearly approximates the non-linear objective function, subject to a limited subset of the constraints and based on assumed power injection values;

adopting the initial dispatch solution as the SCED solution when the initial dispatch solution does not result in any new constraint violations, as determined by performing an AC grid power flow analysis according to the initial dispatch solution, and otherwise performing an LP problem iteration, including:

calculating DC grid power flow in a DC grid power flow analysis, based on the injection values included in the current dispatch solution and correspondingly updating the DC grid constraints in the LP problem;

solving the updated LP problem and adopting the resulting dispatch solution as the SCED solution if no new AC grid constraint violations are detected from repeating the AC grid power flow analysis, and otherwise adding a most-violated one of any newly-detected AC grid constraints to the LP problem and performing another LP problem iteration, and outputting the SCED solution or a control signal derived from the SCED solution determined by the processing circuit, the SCED solution based at least in part on monitored operating parameters of the AC grid and the HVDC grid received by the processing circuit, the SCED solution or control signal providing information to adjust the operation of one or more devices of the hybrid power system to implement the SCED solution.

2. The method of claim 1, wherein determining the initial dispatch solution includes constructing the LP problem as an initial LP problem that includes first decision variables representing AC generation sources in the AC grid and second decision variables representing the power injections that model interaction between the AC and DC grids at the PCC buses, and wherein optimization of the objective function is subject to an AC grid power balance constraint, AC generation source constraints, AC grid power flow constraints, power injection constraints, a DC grid power balance constraint, and DC grid power flow constraints.

3. The method of claim 2, further wherein constructing the initial LP problem includes:

setting each second decision variable to an assumed injection value;

setting initial AC generation values for the first decision variables according to an assumed initial AC dispatch solution;

solving an AC grid power balance equation according to the initial values of the first and second decision variables, to determine initial AC grid power flows; and setting corresponding constraint coefficients in the initial LP problem based on the initial AC grid power flows and further based on a power balance sensitivity factor determined according to a simplified power balance equation for the DC grid.

4. The method of claim 1, wherein determining the initial dispatch solution comprises:

solving the LP problem to obtain a relaxed optimal dispatch solution for the hybrid power system, and invoking a first portion of an AC grid power flow analysis, using the initial LP problem as the current LP problem and the relaxed optimal dispatch solution as the current dispatch solution;

performing the first portion of the AC grid power flow analysis, when invoked, for the current dispatch solution and the current LP problem, based on: computing the AC grid power flow arising from the current dispatch solution;

checking for any new violations corresponding to AC grid constraints not already included in the current LP problem;

terminating the method and adopting the current dispatch solution as the SCED solution, in the event that no new violations are identified and otherwise invoking a DC grid power flow analysis;

performing the DC grid power flow analysis, when invoked, by: solving for a DC grid power flow according to PCC bus states and DC dispatch values known from the current dispatch solution;

calculating updated DC grid constraint coefficients from the DC grid power flow, including a power balance sensitivity for t updating the current LP problem with updated DC grid constraint coefficients and with branch flow sensitivities calculated for the AC grid using the AC generation values in the current dispatch solution;

selecting the most severely violated constraint from among any one or more new violations identified for the AC grid constraints, calculating a corresponding constraint coefficient for the selected constraint and adding the corresponding constraint coefficient to the current LP problem;

solving the current LP problem and checking for new violations for the AC grid constraints; and adopting the resulting dispatch solution as the SCED solution when no new violations are detected, and otherwise adding a most-severely violated one of any newly detected constraint violations to the current LP problem and initiating another LP problem iteration by re-invoking the first portion of the AC grid power flow analysis.

5. The method of claim 4, further comprising implementing the DC grid power flow analysis as a modular software component, wherein invoking the DC grid power flow analysis comprises invoking the modular software component using PCC bus states and DC dispatch values known from the current dispatch solution as arguments, and receiving updated DC grid constraint coefficients as return values from the modular software component, for use in the second portion of the AC grid power flow analysis.

6. The method of claim 1, further comprising setting the assumed power injection values, as used to determine the initial dispatch solution, to two or more different values that reflect differences in power conversion costs or preferences among the PCC buses.

7. The method of claim 1, wherein the initialized power injection values include one Or more non-zero values reflecting generation or loading in the DC grid at corresponding ones of the PCC buses.

8. A processing node configured to determine a Security Constrained Economic Dispatch (SCED) solution for a hybrid power system comprising an Alternating Current (AC) grid interconnected with a multi-terminal High Voltage Direct Current (HVDC) grid at two or more Point of Common Coupling (PCC) buses, said processing node comprising:

interface circuitry to output the SCED solution or signaling dependent thereon, the SCED solution based at least in part on measured operating parameters of the of the AC grid and HVDC grid received by the processing node, the SCED solution or signaling providing information to adjust the operation of one or more devices of the hybrid power system to implement the SCED solution;

a processing circuit having a processor and operatively associated with the interface circuitry and with supporting memory and configured to optimize a non-linear objective function, subject to a set of constraints that include AC grid constraints and DC grid constraints, for determining the successive linear approximation, at least a portion of the SCED solution determined by the processing circuit being based at least in part on monitored operating parameters of the hybrid power system received by the processing circuit, to the processing circuit operable to:

compute a power balance sensitivity for the AC grid, based on calculating AC grid power flow according to a reasonably assumed dispatch solution and initialized power injection values for the PCC buses;

determine an initial dispatch solution by solving a linear programming (LP) problem that linearly approximates the non-linear objective function, subject to a limited subset of the constraints and based on assumed power injection values;

adopt the initial dispatch solution as the SCED solution when the initial dispatch solution does not result in any new constraint violations, as determined by performing an AC grid power flow analysis according to the initial dispatch solution, and performing an LP problem iteration when the initial dispatch solution does result in one or more new constraint violations, including:

calculating DC grid power flow in a DC grid power flow analysis, based on the injection values included in the current dispatch solution and correspondingly updating the DC grid constraints in the LP problem;

solving the updated LP problem and adopting the resulting dispatch solution as the SCED solution if no new AC grid constraint violations are detected from repeating the AC grid power flow analysis, and otherwise adding a most-violated one of any newly-detected AC grid constraints to the LP problem and performing another LP problem iteration.

9. The processing node of claim 8, wherein the processing circuit is configured to determine if the initial dispatch solution includes constructing the LP problem as an initial LP problem that includes first decision variables representing AC generation sources in the AC grid and second decision variables representing the power injections that model interaction between the AC and DC grids at the PCC buses, and wherein optimization of the objective function is subject to an AC grid power balance constraint, AC generation source constraints, AC grid power flow constraints, power injection constraints, a DC grid power balance constraint, and DC grid power flow constraints.

10. The processing node of claim 9, further wherein the processing circuit is configured to construct the initial LP problem based on:

setting each second decision variable to an assumed injection value;

setting initial AC generation values for the first decision variables according to an assumed initial AC dispatch solution;

solving an AC grid power balance equation according to the initial values of the first and second decision variables, to determine initial AC grid power flows; and setting corresponding constraint coefficients in the initial LP problem based on the initial AC grid power flows and further based on a power balance sensitivity factor determined according to a simplified power balance equation for the DC grid.

11. The processing node of claim 8, wherein the processing circuit is configured to determine the initial dispatch solution based on:

solving the LP problem to obtain a relaxed optimal dispatch solution for the hybrid power system, and invoking a first portion of an AC grid power flow analysis, using the initial LP problem as the current LP problem and the relaxed optimal dispatch solution as the current dispatch solution;

performing the first portion of the AC grid power flow analysis, when invoked, for the current dispatch solution and the current LP problem, based on:

computing the AC grid power flow arising from the current dispatch solution;

checking for any new violations corresponding to AC grid constraints not already included in the current LP problem;

terminating the method and adopting the current dispatch solution as the SCED solution, in the event that no new violations are identified and otherwise invoking a DC grid power flow analysis;

performing the DC grid power flow analysis, when invoked, by: solving for a DC grid power flow according to PCC bus states and DC dispatch values known from the current dispatch solution;

calculating updated DC grid constraint coefficients from the DC grid power flow, including a power balance sensitivity for the DC grid, and invoking a second portion of the AC grid power flow analysis, which includes:

updating the current LP problem with updated DC grid constraint coefficients and with branch flow sensitivities calculated for the AC grid using the AC generation values in the current dispatch solution;

selecting the most severely violated constraint from among any one or more new violations identified for the AC grid constraints, calculating a corresponding constraint coefficient for the selected constraint and adding the corresponding constraint coefficient to the current LP problem;

solving the current LP problem and checking for new violations for the AC grid constraints; and adopting the resulting dispatch solution as the SCED solution when no new violations are detected, and otherwise adding a most-severely violated one of any newly detected constraint violations to the current LP problem and initiating another LP problem iteration by re-invoking the first portion of the AC grid power flow analysis.

12. The processing node of claim 11, wherein the processing circuit is further configured to implement the DC grid power flow analysis as a modular software component, wherein invoking the DC grid power flow analysis comprises invoking the modular software component using PCC bus states and DC dispatch values known from the current dispatch solution as arguments, and receiving updated DC grid constraint coefficients as return values from the modular software component, for use in the second portion of the AC grid power flow analysis.

13. The processing node of claim 8, wherein the processing circuit is configured to set the assumed power injection values, as used to determine the initial dispatch solution, to two or more different values that reflect differences in power conversion costs or preferences among the PCC buses.

14. The processing node of claim 8, wherein the processing circuit is configured to set the initialized power injection values so as to include one or more non-zero values reflecting generation or loading in the DC grid at corresponding ones of the PCC buses.

* * * * *